(12) United States Patent
Leech

(10) Patent No.: US 9,802,102 B2
(45) Date of Patent: *Oct. 31, 2017

(54) ELECTRONIC TRACKING SYSTEM WITH HEADS UP DISPLAY

(71) Applicant: NIKE, Inc., Beaverton, OR (US)

(72) Inventor: Nicholas A. Leech, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,112

(22) Filed: Feb. 20, 2017

(65) Prior Publication Data

US 2017/0157491 A1 Jun. 8, 2017

Related U.S. Application Data

(63) Continuation of application No. 14/291,236, filed on May 30, 2014, now Pat. No. 9,597,574, which is a (Continued)

(51) Int. Cl.
*A63B 71/06* (2006.01)
*A63B 24/00* (2006.01)
(Continued)

(52) U.S. Cl.
CPC ...... *A63B 71/0622* (2013.01); *A63B 24/0021* (2013.01); *A63B 24/0062* (2013.01); *A63B 69/3608* (2013.01); *A63B 69/3676* (2013.01); *G01S 13/66* (2013.01); *G01S 15/66* (2013.01); *G01S 17/66* (2013.01); *G01S 19/19* (2013.01); *G02B 27/0093* (2013.01); *G02B 27/0172* (2013.01); *G06F 3/0304* (2013.01); *G06F 3/0346* (2013.01); *A63B 2024/0034* (2013.01); *A63B 2024/0056* (2013.01); *A63B 2069/3605* (2013.01); *A63B 2071/0666* (2013.01); *A63B 2071/0691* (2013.01); *A63B 2220/12* (2013.01);
(Continued)

(58) Field of Classification Search
USPC .......................................... 473/152, 407, 353
See application file for complete search history.

(56) References Cited

U.S. PATENT DOCUMENTS 3,804,411 A 4/1974 Hendry
4,614,340 A 9/1986 Hosoya
(Continued)

*Primary Examiner* — Pierre E Elisca
(74) *Attorney, Agent, or Firm* — Quinn IP Law

(57) ABSTRACT

An electronic tracking system is disclosed for assisting a user in determining distances to objects in a sporting environment. The system includes a user tracking system for determining the location of a user, a heads up display for displaying information to the user, and a processor operable to communicate with the user tracking system and heads up display. The heads up display is designed to be worn by the user, and to display images within the user's field of view. The processor is programmed to determine a distance between the user's determined location and an object, such as a ball, located within the sporting environment. This information is displayed via the heads up display as a numeric representation of the determined distance. If tracking a ball, the heads up display may display an object indication, such as an enhanced image or a comet tail, superimposed over or adjacent the ball.

20 Claims, 9 Drawing Sheets

Related U.S. Application Data continuation-in-part of application No. 13/971,211, filed on Aug. 20, 2013, now Pat. No. 9,457,246, which is a continuation of application No. 13/341,442, filed on Dec. 30, 2011, now Pat. No. 8,540,583.

(51) Int. Cl.

| | |
|---|---|
| A63B 69/36 | (2006.01) |
| G01S 13/66 | (2006.01) |
| G01S 15/66 | (2006.01) |
| G01S 17/66 | (2006.01) |
| G01S 19/19 | (2010.01) |
| G02B 27/01 | (2006.01) |
| G02B 27/00 | (2006.01) |
| G06F 3/0346 | (2013.01) |
| G06F 3/03 | (2006.01) |

(52) U.S. Cl.
CPC ....... *A63B 2220/13* (2013.01); *A63B 2220/20* (2013.01); *A63B 2220/30* (2013.01); *A63B 2220/806* (2013.01); *A63B 2225/20* (2013.01); *A63B 2225/50* (2013.01); *G02B 2027/014* (2013.01); *G02B 2027/0138* (2013.01); *G02B 2027/0141* (2013.01); *G02B 2027/0178* (2013.01)

(56) References Cited

U.S. PATENT DOCUMENTS

| | | | |
|---|---|---|---|
| 5,342,051 A | 8/1994 | Rankin et al. | |
| 5,423,549 A | 6/1995 | Englmeier | |
| 5,564,698 A | 10/1996 | Honey et al. | |
| 5,781,505 A | 7/1998 | Rowland | |
| 5,910,057 A | 6/1999 | Quimby et al. | |
| 5,912,700 A | 6/1999 | Honey et al. | |
| 6,579,190 B2 | 6/2003 | Yamamoto | |
| 6,592,465 B2 * | 7/2003 | Lutz | A63B 43/06 348/208.14 |
| 6,634,959 B2 | 10/2003 | Kuesters | |
| 7,138,963 B2 | 11/2006 | Hobgood et al. | |
| 7,207,902 B1 | 4/2007 | Hamlin | |
| 7,595,933 B2 | 9/2009 | Tang | |
| 7,811,163 B2 | 10/2010 | Ratcliffe | |
| 7,855,638 B2 | 12/2010 | Huston | |
| 7,946,926 B1 | 5/2011 | Balardeta et al. | |
| 8,400,346 B2 | 3/2013 | Hubbard et al. | |
| 8,440,583 B2 | 5/2013 | Shelestak et al. | |
| 8,540,583 B2 | 9/2013 | Leech | |
| 2002/0177490 A1 | 11/2002 | Yong et al. | |
| 2003/0027655 A1 * | 2/2003 | Lutz | A63B 43/06 473/198 |
| 2004/0212630 A1 | 10/2004 | Hobgood et al. | |
| 2005/0101411 A1 | 5/2005 | Stiller et al. | |
| 2005/0227791 A1 | 10/2005 | McCreary et al. | |
| 2005/0233815 A1 | 10/2005 | McCreary et al. | |
| 2006/0105857 A1 | 5/2006 | Stark | |
| 2006/0116185 A1 | 6/2006 | Krull | |
| 2007/0021226 A1 | 1/2007 | Tyroler | |
| 2007/0032306 A1 | 2/2007 | Zanzucchi et al. | |
| 2008/0220892 A1 | 9/2008 | Williamson et al. | |
| 2008/0254916 A1 | 10/2008 | Kim et al. | |
| 2009/0017944 A1 | 1/2009 | Savarese et al. | |
| 2009/0213038 A1 | 8/2009 | Huang et al. | |
| 2010/0103075 A1 | 4/2010 | Kalaboukis et al. | |
| 2010/0151955 A1 | 6/2010 | Holden | |
| 2012/0236031 A1 | 9/2012 | Haddick et al. | |
| 2013/0130843 A1 | 5/2013 | Burroughs et al. | |
| 2013/0137528 A1 | 5/2013 | Ishii et al. | |
| 2013/0172093 A1 | 7/2013 | Leech | |
| 2014/0139455 A1 * | 5/2014 | Argiro | A63F 13/02 3/2 |
| 2015/0057107 A1 | 2/2015 | Leech | |
| 2015/0126308 A1 | 5/2015 | Penn et al. | |
| 2016/0158640 A1 * | 6/2016 | Gupta | A63F 13/213 463/3 |

\* cited by examiner

ELECTRONIC TRACKING SYSTEM WITH HEADS UP DISPLAY

CLAIM OF PRIORITY AND CROSS-REFERENCE TO RELATED APPLICATION

This application is a continuation of U.S. patent application Ser. No. 14/291,236, filed on May 30, 2014, published as U.S. Patent Appl. Pub. No. 2015/0057095 A1, and now allowed, which is a continuation-in-part of U.S. patent application Ser. No. 13/971,211, filed on Aug. 20, 2013, now U.S. Pat. No. 9,457,246 B2, which is a continuation of U.S. patent application Ser. No. 13/341,442, filed on Dec. 30, 2011, now U.S. Pat. No. 8,540,583 B2, all of which are incorporated herein by reference in their respective entireties and for all purposes.

TECHNICAL FIELD

The present disclosure relates generally to a golf aid for conveying golf-related information via a heads up display.

BACKGROUND

The game of golf is an increasingly popular sport at both amateur and professional levels. Both amateur and professional golfers spend sizeable amounts of time developing the muscle memory and fine motor skills necessary to improve their game. Golfers try to improve their game by analyzing launch and trajectory information while playing golf.

SUMMARY

A golf aid for displaying one or more golf-related statistics to a user includes a golf ball tracking system for tracking a flight of a golf ball, a heads up display, and a processor in communication with the golf ball tracking system and the heads up display. The heads up display is configured to be worn on the user's head and display an image within the user's field of view. The processor is configured to compute one or more shot statistics from the tracked flight of the golf ball and display the one or more computed shot statistics within the field of view of the user via the heads up display. The one or more shot statistics include at least one of an initial ball speed, a spin rate, a carry, and a remaining distance to the pin.

In another embodiment, the processor is configured to compute one or more shot statistics from the tracked flight of the golf ball, maintain one or more play statistics relating to a plurality of golf shots, and display the one or more computed shot statistics, the one or more play statistics, and an enhanced image of the golf ball flight within the field of view of the user via the heads up display. The one or more play statistics may include at least one of a total number of strokes for a round, a score relative to par, a number of fairways hit, a number of greens in regulation, and an average number of puts per green.

In another embodiment, the processor may be operable to execute instructions stored on a non-transitory, computer readable medium to assist a user by displaying one or more golf-related statistics. When executed, the stored instructions cause the processor to perform steps that include receiving an indication of a tracked flight of a golf ball from a sensor, computing one or more shot statistics from the tracked flight of the golf ball, and displaying the one or more computed shot statistics via a heads up display.

The above features and advantages and other features and advantages of the present disclosure are readily apparent from the following detailed description of the representative modes for carrying out the disclosure when taken in connection with the accompanying drawings.

DETAILED DESCRIPTION OF ILLUSTRATED EXAMPLES

A system for tracking a golf ball is disclosed. The system may track the trajectory of a golf ball and display an enhanced image of the golf ball on a display such that the enhanced image is imposed upon a user's real world view. Displaying an enhanced image of the golf ball may help a user view the trajectory of the golf ball and find the golf ball after the golf ball lands. In some embodiments, the system may display an enhanced image of the golf ball on a heads-up display configured to be worn on a person's head. For example, the heads-up display may include a pair of eyeglasses having a lens. By displaying an enhanced image of the golf ball on the lens, the user may view the enhanced image while remaining hands-free. The enhanced image may include at least a portion of the trajectory of the golf ball. Thus, the enhanced image may facilitate tracking the trajectory of the golf ball, which may help the user to compare the golf ball's trajectory with an ideal trajectory. The enhanced image may also help the user see where the golf ball lands, which may help a user find the golf ball. The system may display other information, such as launch and flight information about the ball, on the heads-up display.

Figure 1:
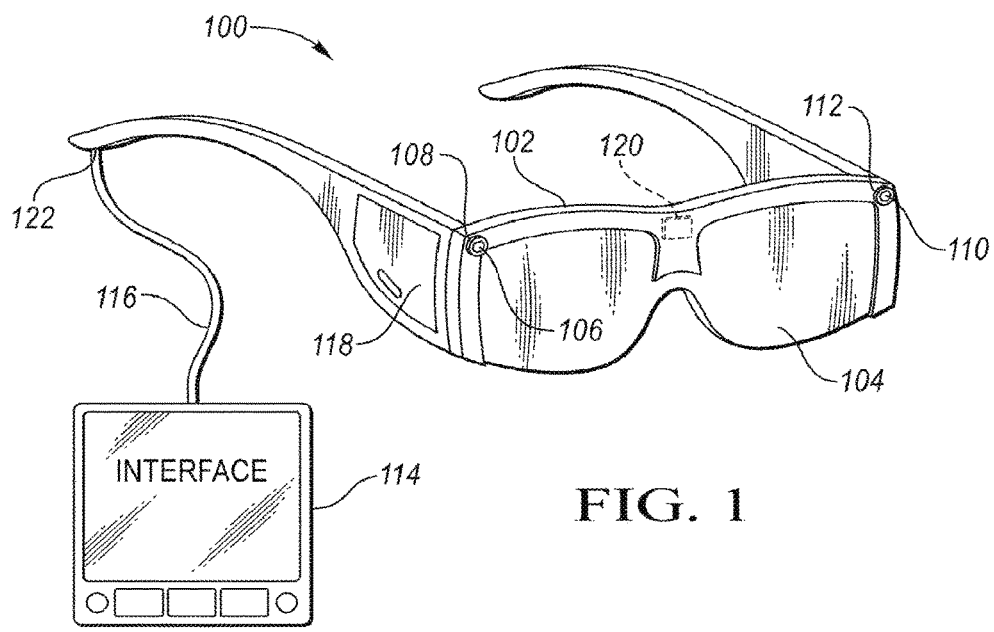
FIG. 1 is a schematic partially perspective view of embodiment of the disclosed system.
Figure 2:
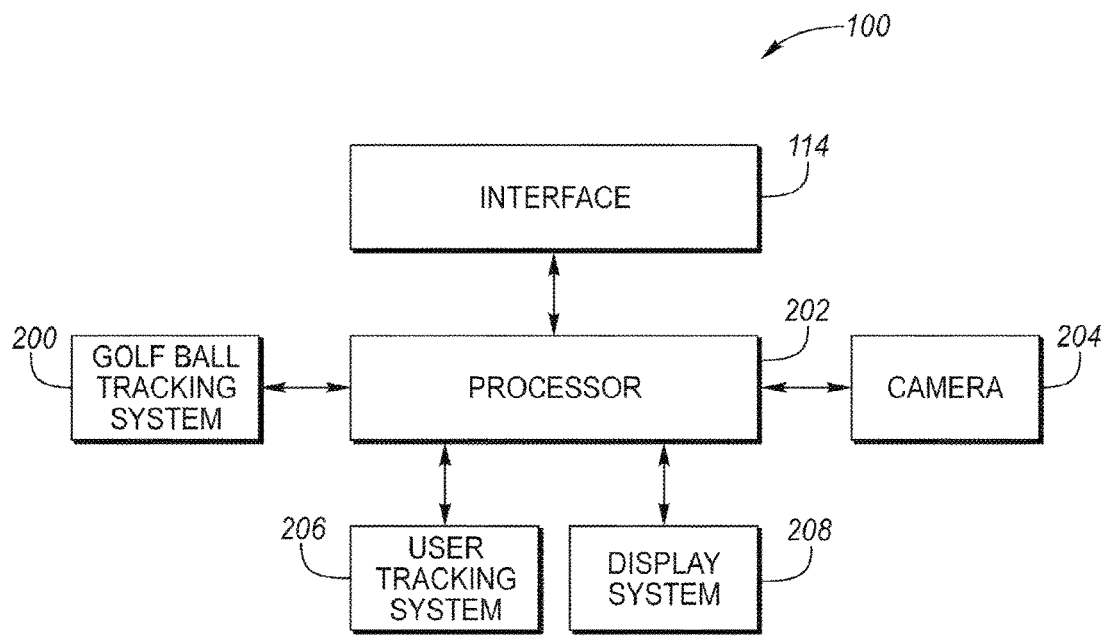
FIG. 2 is a schematic diagram of the embodiment of FIG. 1.

FIGS. 1 and 2 illustrate an embodiment of a system 100 for tracking a golf ball. System 100 may include a display device configured to be worn on a person's head. As shown in FIG. 1, the display device may include a pair of eyeglasses 102. For example, the display device may include any of the head mounted displays described in U.S. Pat. No. 7,595,933, entitled Head Mounted Display System, issued to Tang on Sep. 29, 2009, the disclosure of which is hereby incorporated by reference in its entirety. A display system 208 may be associated with eyeglasses 102 to display images to the user. System 100 may include a golf ball tracking system 200 to track the location of a golf ball. System 100 may include a user tracking system 206 to track the location of the user to help navigate and/or determine distances between the user and landmarks, such as, for example, trees, sandtraps, doglegs, natural hazards (e.g., water, tall grass, bluffs etc), front/middle/back portions of a green, layup areas, and/or the next pin on the golf course. System 100 may include a camera 204 configured to capture and record images of the user's real world view to determine where to display enhanced images to the user such that the enhanced images are imposed upon the user's real world view. System 100 may include an interface 114 to enable a user to communicate with system 100. System 100 may include at least one processor 202 configured to control camera 204, golf ball tracking system 200, user tracking system 206, and/or display system 208. In some embodiments, processor 202 may be coupled to camera 204, golf ball tracking system 200, user tracking system 206, and/or display system 208. In some embodiments, processor 202 may be configured to communicate with camera 204, golf ball tracking system 200, user tracking system 206, and/or display system 208. In some embodiments, system 100 may include more than one processor. For example, in some embodiments, a separate processor may be included for each component of system 100.

In this manner, the processor 202 may be embodied as one or multiple digital computers, data processing devices, and/or digital signal processors (DSPs), which may have one or more microcontrollers or central processing units (CPUs), read only memory (ROM), random access memory (RAM), electrically-erasable programmable read only memory (EEPROM), high-speed clock, analog-to-digital (A/D) circuitry, digital-to-analog (D/A) circuitry, input/output (I/O) circuitry, and/or signal conditioning and buffering electronics. The processor 202 may further be associated with computer readable non-transitory memory having stored thereon instructions that cause the processor 202 to provide an informational display to a user via the display system 208

While the embodiment of FIG. 1 includes eyeglasses 102, other embodiments may include other types of display devices configured to be mounted on a person's head. For example, system 100 may include a visor, helmet, or goggles. The type of display device may be selected based on a variety of factors. For example, the type of display device may be selected based on the type of environment system 100 is meant to be used in. Components of system 100 may be mounted to eyeglasses 102. Eyeglasses 102 may be hollow such that components of system 100 may be housed within eyeglasses 102. In some embodiments, eyeglasses 102 may include a removable cover 118 for allowing access to any components mounted within eyeglasses 102. Eyeglasses 102 may include one or more lenses. FIG. 1 shows eyeglasses 102 with a single lens 104. In some embodiments, lens 104 may include a partially reflective mirror. The partially reflective mirror may allow the real world to be seen through the reflected surface such that a transparent image may be imposed upon a real world view.

Display system 208 may be mounted on and housed within eyeglasses 102. In some embodiments, display system 208 may include optical components, projecting components, imaging devices, power sources, and/or light sources. For example, display system 208 may include the components as described in U.S. Pat. No. 7,595,933. In some embodiments, display system 208 may include components that display images. For example, display system 208 may include a display element, such as a flat panel display or a liquid crystal display, as described in U.S. Pat. No. 7,595,933. In some embodiments, lens 104 may include a lens system that relays images to a user's eye from a display element.

User tracking system 206 may include one or more user location sensors 120. User location sensor 120 may sense the location of the user. User location sensor 120 may be mounted on and housed within eyeglasses 102. User location sensor 120 may be positioned in any suitable position. The type of user location sensor may include any suitable type of sensor. For example, user location sensor 120 may include a global positioning system receiver. The location, number, and type of user location sensor(s) may be selected based on a number of factors. For example, the type of user location sensor(s) may be selected based on the other types of components included in system 100. In some embodiments, processor 202 may be configured to communicate with user location sensor 120 to determine the location of the user on a golf course and to determine the distance between the user and a landmark on the golf course. For example, in some embodiments, processor 202 may be configured to communicate with user location sensor 120 to determine the distance between the user and the next pin on the course. Such information would help a user find his yardages during a round of golf.

Golf ball tracking system 200 may include one or more golf ball sensors. The golf ball sensor may be configured to detect the golf ball. The golf ball sensor may be mounted on or housed within eyeglasses 102. For example, as shown in FIG. 1, a golf ball sensor 110 may be mounted such that golf ball sensor 110 is exposed through an opening 112 in eyeglasses 102. FIG. 1 shows golf ball sensor 110 as being mounted such that it will be positioned above the user's left eye when a user wears eyeglasses 102. In other embodiments, golf ball sensor 110 may be positioned in any suitable position. The location and number of golf ball sensors 110 may be selected based on a number of factors. For example, the location of the golf ball sensor 110 may be selected based on the positioning of other components and/or the sensitivity of the golf ball sensor 110.

In some embodiments, the golf ball sensor 110 may include a reflective sensor capable of detecting the location of a golf ball without any communication components being provided within the golf ball. For example, the golf ball sensor 110 may include radar, LIDAR, optical, and/or sonar sensors. In some embodiments, the golf ball tracking system 200 may include communication components provided inside and/or on the golf ball. Such golf ball tracking systems may include a golf ball sensor 110 capable of detecting the location of a golf ball by detecting a tracking component provided within the golf ball. For example, the golf ball tracking system 200 may include a radio-frequency identification system, a BLUETOOTH technology system, an infrared system, and/or global positioning system receiver.

In some embodiments, camera 204 may act as the golf ball tracking system 200. Camera 204 may find the contrast difference between the golf ball and the background of the ball as the golf ball travels. For example, camera 204 may find the contrast difference between the golf ball and the sky as the golf ball flies through the air.

In some embodiments, the golf ball tracking system 200 may include a special coating on the golf ball. Such golf ball tracking systems 200 may include a golf ball sensor 110 capable of detecting the location of a golf ball by detecting the special coating provided on the golf ball. The special coating may include an ultraviolet sensitive paint and the golf ball sensor 110 may include a camera 204 configured to capture images illuminated by ultraviolet light only. For example, a UV transmitting, visible light blocking filter may be included over the camera lens so that only ultraviolet passes through the filter and all visible light is absorbed by the filter.

In some embodiments, the golf ball sensor 110 and the user location sensor 120 may include the same type of sensor. For example, the golf ball sensor 110 and the user location sensor 120 may both include an infrared system. Embodiments of golf ball tracking systems 200 are described in more detail below.

Camera 204 may capture and record images from the user's viewpoint. The camera 204 may include any suitable type of camera. The type of camera may be selected based on a variety of factors. For example, the type of camera may be selected based on the type of display included in the system or the type of golf ball tracking system 200 used in the system. The camera 204 may be mounted on or inside eyeglasses 102. For example, as shown in FIG. 1, a camera 204 may be mounted inside eyeglasses 102 with a camera lens 106 exposed through an opening 108 in eyeglasses 102. FIG. 1 shows camera lens 106 as being mounted so that it will be positioned above the user's right eye when a user wears eyeglasses 102. In other embodiments, the camera 204 may be positioned in any other suitable position. The location of the camera 204 may be selected based on a number of factors. For example, the location of the camera 204 may be selected to provide the camera lens 106 in a position close to the user's eye so that the view from the camera 204 is similar to the view from the user's eye.

In some embodiments, processor 202 may be configured to process information relayed to and from the golf ball sensor 110 and/or the communication component provided with the golf ball. Processor 202 may use this information to determine the location of the golf ball. In some embodiments, the processor may also be configured to control display system 208. As a result, the processor 202 may control the images shown by the display. In some embodiments, processor 202 may be configured to process information relayed to and from user location sensor 120. The processor 202 may use this information to determine the location of the user. In some embodiments, the processor 202 may determine the distance between the user and a landmark, such as the pin or a restroom. In some embodiments, processor 202 may be configured to process information relayed to processor 202 from camera 204. Processor 202 may use this information to display images captured and recorded by the camera to the user. Processor 202 may be configured to display enhanced images to the user.

In some embodiments, the system may include an interface 114 configured to communicate with components of the system. In some embodiments, the interface may be in communication with golf ball tracking system 200, camera 204, and/or eyeglasses 102 either directly or through processor 202. Interface 114 may be in communication with processor 202, golf ball tracking system 200, camera 204, and/or eyeglasses 102 either wirelessly or by wire. For example, FIG. 1 shows wire 116 extending through an opening 122 in eyeglasses 102. Wire 116 may couple interface 114 to processor 202. Interface 114 may provide the user with a way to control system 100. In some embodiments, interface 114 may have an interface display. Such an interface display may show information about control settings and commands for system 100. In some embodiments, interface 114 may have inputs for providing data and control signals to system 100. For example, interface 114 may have buttons. In some embodiments, system 100 may include a touch screen that provides both an interface display and an input. In some embodiments, a user may wear eyeglasses 102 and put interface 114 in his pocket during use.

Figure 3:
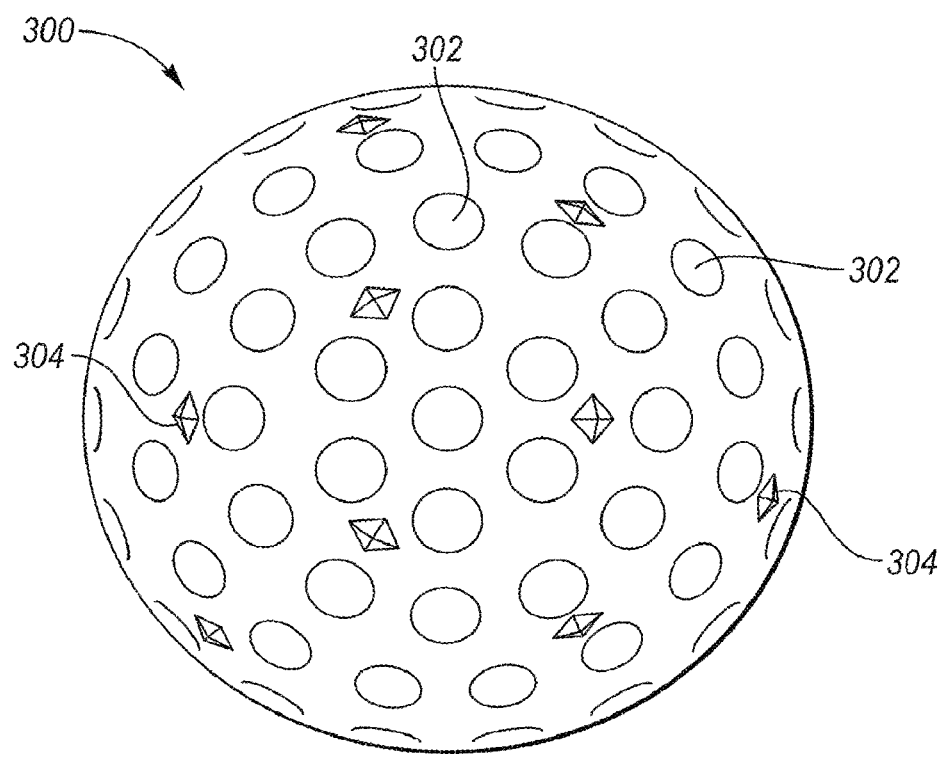
FIG. 3 is a top view of a golf ball provided with communication components.
Figure 4:
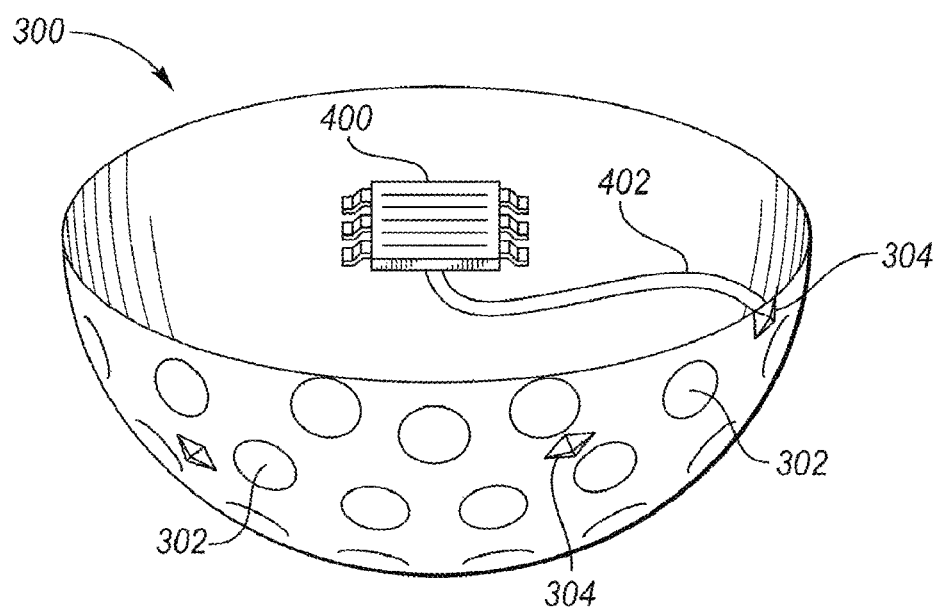
FIG. 4 is a perspective partial cross sectional view of the golf ball of FIG. 3.

As discussed above, golf ball tracking system 200 may include a golf ball provided with communication components that are configured to communicate with a golf ball sensor 110. FIGS. 3 and 4 show a golf ball 300 that may be provided with communication components. Golf ball 300 may include any suitable type of golf ball. For example, in some embodiments, golf ball 300 may be a one-piece golf ball. In other embodiments, golf ball 300 may be a multi-piece golf ball, such as a 2-piece or 3-piece golf ball. Golf ball 300 may have an outer surface including dimples 302. Golf ball 300 may be provided with communication components including emitting diodes 304 and a microchip 400. For example, the communication components may include those described in U.S. Pat. No. 6,634,959, entitled Golf Ball Locator, issued to Kuesters on Oct. 21, 2003, the disclosure of which is hereby incorporated by reference in its entirety, and as described in U.S. Pat. No. 5,564,698, entitled Electromagnetic Transmitting Hockey Puck, issued to Honey et al. on Oct. 15, 1996, the disclosure of which is hereby incorporated by reference in its entirety. Emitting diodes 304 may be disposed on the outer surface of golf ball 300. FIG. 4 shows a cross-sectional view of golf ball 300. As shown in FIG. 4, microchip 400 may be disposed inside golf ball 300. Emitting diodes 304 may be connected to microchip 400 by wires 402. In some embodiments, microchip 400 may be configured to power and control emitting diodes 304. In some embodiments, microchip 400 may be configured to communicate with processor 202. For example, microchip 400 may be configured to communicate with processor 202 via wireless signals. In some embodiments, microchip 400 may include a power source, timing circuits, on/off switches, a pulsing circuit, and/or shock sensors to control the powering of emitting diodes 304. In such embodiments, the shock sensors may be configured to detect movement of golf ball 300. Accordingly, movement of golf ball 300 may trigger the on/off switch to power emitting diodes 304. To conserve power, timing circuits may be configured to control how long emitting diodes 304 are powered. Thus, shock sensors may detect when a golf club strikes golf ball 300, which may trigger the on/off switch to power emitting diodes 304 while golf ball 300 is in flight. After a predetermined amount of time, the timing circuits may trigger the on/off switch to shut off power to emitting diodes 304.

In embodiments in which golf ball 300 includes emitting diodes 304, golf ball sensor 110 may be configured to detect signals from emitting diodes 304. For example, emitting diodes 304 may include infrared emitting diodes and golf ball sensor 110 may include an infrared receiver. Golf ball sensor 110 may transmit this data to processor 202. Processor 202 may be configured to use this data to determine the location of emitting diodes 304, and thus, the location of golf ball 300. In some embodiments, in place of or in addition to golf ball sensor 110, camera 204 may be configured to detect emissions from emitting diodes 304. In some embodiments, in place of or in addition to golf ball sensor 110, multiple golf ball sensors may be provided in the location in which the golf ball is to be tracked. For example, multiple golf ball sensors may be provided in various positions on a golf course. In such embodiments, the position of the golf ball sensors may be known and the golf ball sensors may be used to determine the location of the golf ball by detecting emissions from emitting diodes 304.

Figure 5:
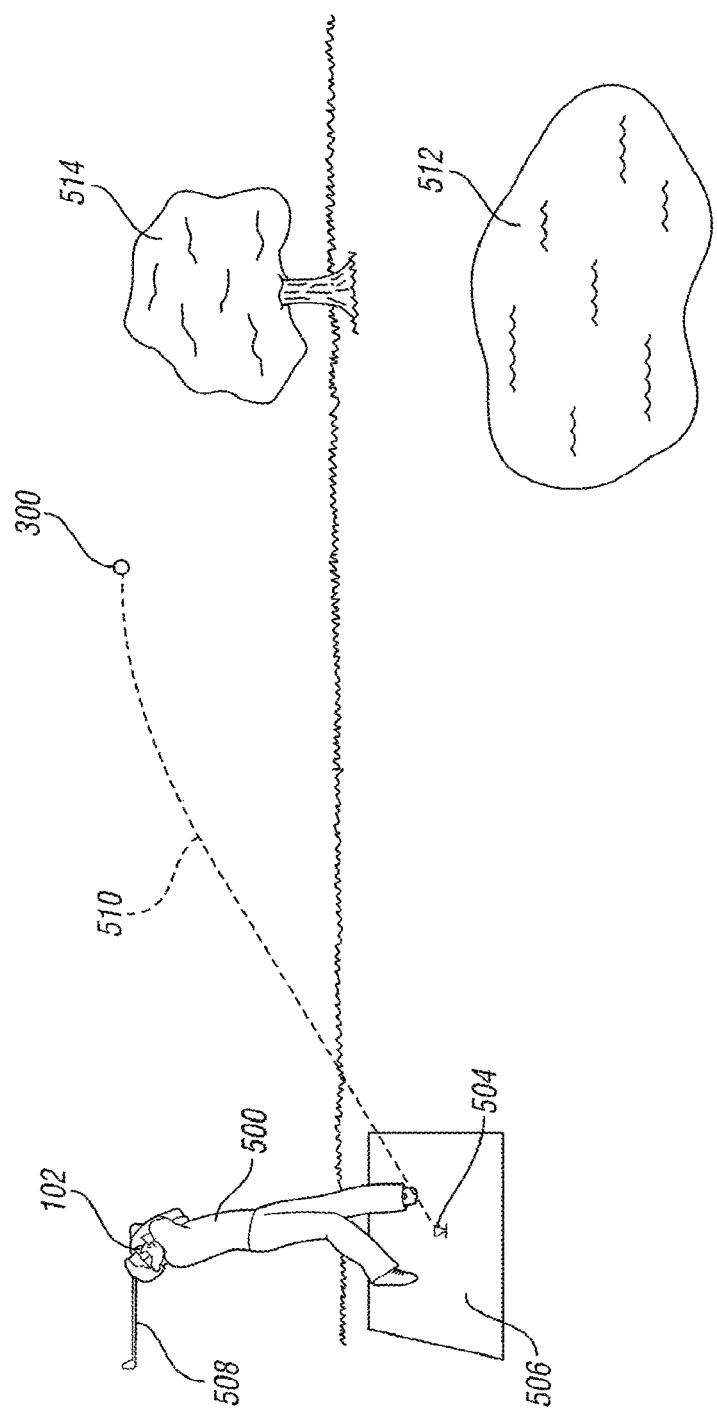
FIG. 5 is a schematic side perspective view of a golfer wearing the system shown in FIGS. 1-2 and hitting the golf ball of FIGS. 3-4.
Figure 6:
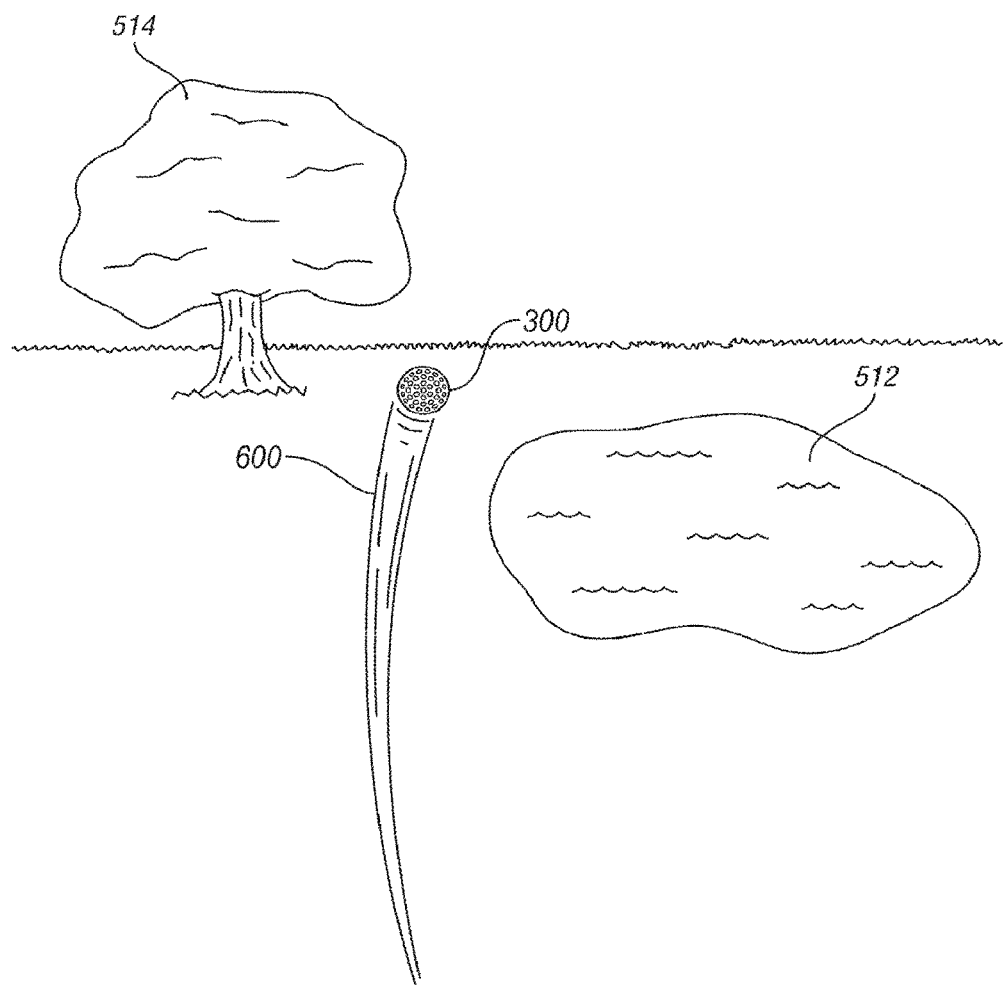
FIG. 6 is an schematic enhanced image of the golf ball imposed upon the golfer's real world view.

FIG. 5 illustrates a user 500 wearing eyeglasses 102 while using a golf club 508 to hit a golf ball 300 off of a tee 504 in a tee box 506 along path 510. FIG. 6 shows the user's view after he hits golf ball 300. Eyeglasses 102 provide an enhanced image of golf ball 300 imposed upon the user's real world view such that the enhanced image's position matches the position of golf ball 300. In FIG. 6, the user's real world view through lens 104 includes golf ball 300, a tree 514, and a pond 512 disposed within user's line of sight. The enhanced image adds a comet tail 600 to golf ball 300 as golf ball 300 flies through the air toward tree 514 and pond 512. Comet tail 600 may lag behind golf ball 300 such that comet tail 600 stays visible after golf ball 300 lands. Comet tail 600 may represent at least a portion of the trajectory of golf ball 300. In some embodiments, comet tail 600 may represent the entire trajectory of golf ball 300. As a result, user 500 may see the entire trajectory of golf ball 300 at least temporarily after golf ball 300 lands.

Figure 8:
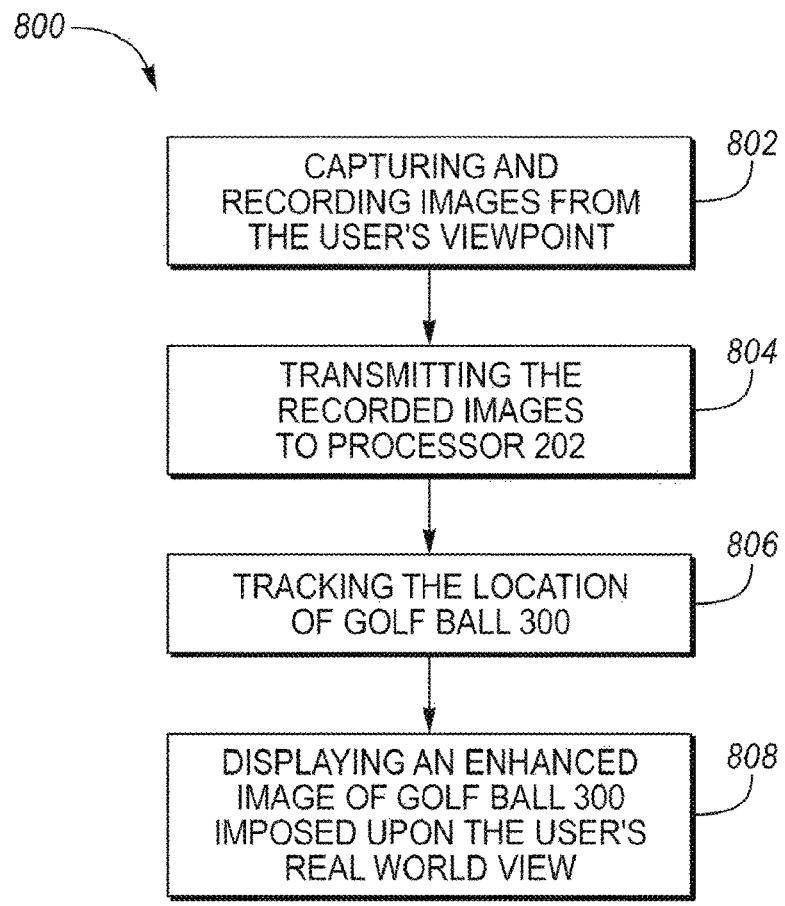
FIG. 8 is a schematic flow chart of a method of displaying an enhanced image of the golf ball imposed upon the golfer's real world view according to an embodiment.

FIG. 8 shows a method 800 of displaying an enhanced image of the golf ball imposed upon the golfer's real world view according to an embodiment. The steps of method 800 may be performed in any order. Step 802 may include capturing and recording images from the user's viewpoint. Step 804 may include transmitting the recorded images to processor 202. Camera 204 may perform steps 802 and 804. Step 806 may include tracking the location of golf ball 300. Golf ball tracking system 200 and/or processor 202 may perform step 806. For example, in the embodiment discussed above with reference to FIGS. 3 and 4, hitting golf ball 300 may trigger shock sensors. As a result, on/off switches may cause microchip 400 to power emitting diodes 304, which may cause emitting diodes 304 to pulse. Golf ball sensor 110 may detect the pulses and transmit data to processor 202. Processor 202 may use the transmitted data to determine the location of emitting diodes 304, and thus, the location of golf ball 300.

Step 808 may include displaying an enhanced image of golf ball 300 upon the user's real world view. In some embodiments, processor 202 may use the location of golf ball 300 and the images recorded by camera 204 to make display system 208 display an enhanced image of golf ball 300 to user 500. The enhanced image may be displayed such that the enhanced image overlays the user's real world view. In some embodiments, the enhanced image may be transparent. In some embodiments, the enhanced image may be stereoscopic. In some embodiments, the enhanced image may be bigger and/or brighter than the recorded image. For example, the enhanced image may appear to be glowing. The enhanced image may be selected to make golf ball 300 and the trajectory of golf ball 300 stand out more to the user while allowing user to still see a real world view. As shown in FIG. 6, the enhanced image may include comet tail 600 trailing behind golf ball 300. Comet tail 600 may show the trajectory of golf ball 300 such that user 500 can compare the trajectory of golf ball 300 to an ideal trajectory. In some embodiments, display system 208 may display an ideal trajectory such that the trajectory of golf ball 300 may be compared with the ideal trajectory.

Figure 7:
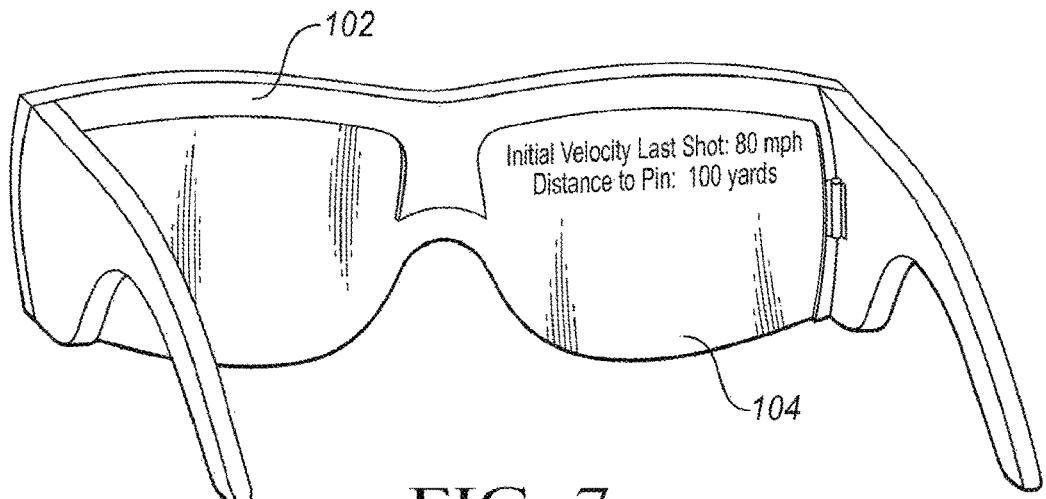
FIG. 7 is a schematic perspective view of information displayed on the eyeglasses of FIGS. 1-2.

In some embodiments, processor 202 may use the location of golf ball 300 at various times to determine launch information and/or flight information about golf ball 300. In some embodiments, to determine launch information and/or flight information about golf ball 300, system 100 may use methods and components described in U.S. Patent Application Publication 2007/0021226, entitled Method of and Apparatus for Tracking Objects in Flight Such as Golf Balls and the Like, applied for by Tyroler and published on Jan. 25, 2007, the disclosure of which is hereby incorporated by reference in its entirety. In some embodiments, to determine launch information and/or flight information about golf ball 300, system 100 may use methods and components described in U.S. Patent Application Publication 2005/0233815, entitled Method of Determining a Flight Trajectory and Extracting Flight Data for a Trackable Golf Ball, applied for by McCreary et al. and published on Oct. 20, 2005, the disclosure of which is hereby incorporated by reference in its entirety. In some embodiments, to determine launch information and/or flight information about golf ball 300, system 100 may use methods and components described in U.S. Patent Application Publication 2010/0151955, entitled Global Positioning System Use for Golf Ball Tracking, applied for by Holden and published on Jun. 17, 2010, the disclosure of which is hereby incorporated by reference in its entirety. To determine launch information and/or flight information about golf ball 300, system 100 may use methods and components described in U.S. Patent Application Publication 2008/0254916, entitled Method of Providing Golf Contents in Mobile Terminal, applied for by Kim et al. and published on Oct. 16, 2008, the disclosure of which is hereby incorporated by reference in its entirety. FIG. 7 shows how information may be displayed to the user. For example, launch information, such as initial velocity, and the distance to the pin may be displayed on lens 104. In another example, lens 104 may display the ball spin rate and/or launch angle. By displaying information to user 500 on eyeglasses 102, user 500 may reference this information without having to pull out a device or without having do anything other than look in front of his eye. Accordingly, the user may quickly and easily reference information without having to distract from other activities.

In some embodiments, system 100 may include a separate launch monitor configured to monitor and record data related to the golf ball, golf club, and/or golfer. For example, system 100 may include the launch monitor described in U.S. patent application Ser. No. 13/307,789, entitled Method and Apparatus for Determining an Angle of Attack from Multiple Ball Hitting, applied for by Ishii et al. and filed on Nov. 30, 2011, the disclosure of which is hereby incorporated by reference in its entirety. The separate launch monitor may be in communication with processor 202.

User tracking system 206 may determine the location of user 500. For example, in embodiments in which global positioning system receiver 120 is included in eyeglasses 102, global positioning system receiver 120 may determine the location of user and transmit the location of the user to processor 202. Processor 202 may be configured to know the locations of various landmarks on a golf course. Processor 202 may be configured to determine the distance between the location of the user and the various landmarks on the golf course. For example, processor 202 may be configured to determine the distance between user 500 and the next pin on the golf course. Processor 202 may be configured to display this distance to user 500, as shown in FIG. 7. In some embodiments, the user may be a golfer wearing eyeglasses 102. In some embodiments, the user may be a caddy wearing eyeglasses 102 and watching a golfer. The caddy may use the system to help the golfer choose clubs, adjust his swing, and find golf balls. In some embodiments, the user may be a spectator wearing the eyeglasses and watching a golfer.

In some embodiments, system 100 may display an image of golf ball 300 and/or an image of user 500 on a representation of the golf course. Display system 208 may display these images to user 500 on eyeglasses 102 to help user 500 navigate and/or locate golf ball 300. To display the images, system 100 may use the methods and components described in U.S. Patent Application Publication 2007/0021226, U.S. Patent Application Publication 2005/0233815, U.S. Patent Application Publication 2010/0151955, and/or U.S. Patent Application Publication 2008/0254916.

Figure 9:
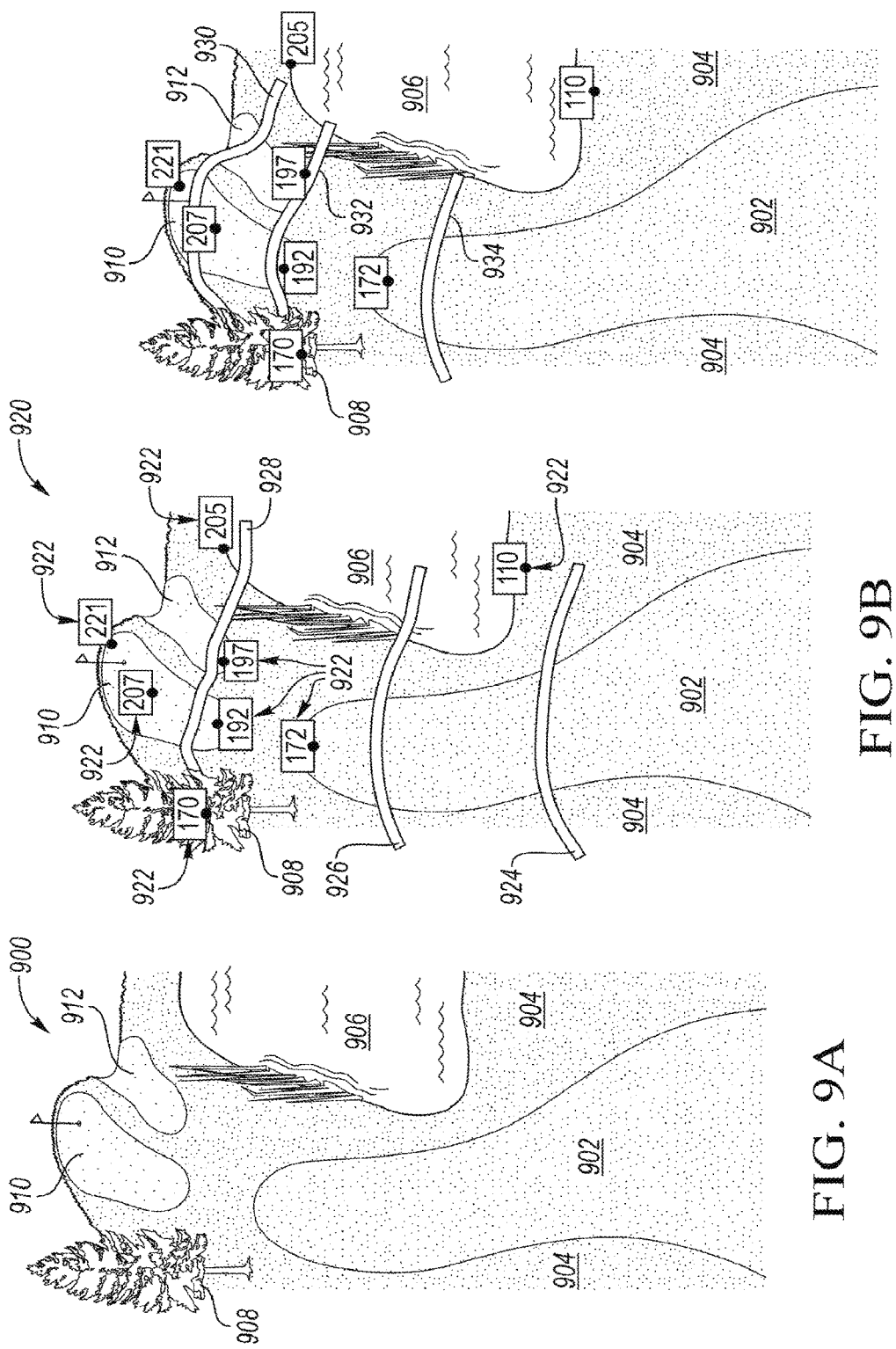
FIG. 9A is a schematic perspective view of a golfer's real world view of a golf hole.
FIG. 9B is a schematic enhanced image of distance markers imposed upon the golfer's real world view of FIG. 9A.
FIG. 9C is a schematic enhanced image of distance markers imposed upon the golfer's real world view of FIG. 9A.

FIG. 9A schematically illustrates a (non-enhanced) view 900 that a user may have while standing in a fairway 902 of a golf course. In this example, the user may see the fairway 902, the rough 904, a lake 906, a prominent tree 908, the green 910, and a sand bunker 912 next to the green 910. FIG. 9B schematically illustrates an enhanced view 920 of the scene provided in FIG. 9A, which may be available, for example, through the eyeglasses 102 described above.

Using the user's present location as determined by the user tracking system 206, together with known locations of the various objects, the processor 202 may compute a plurality of relative distances and display them to the user via the eyeglasses 102. In addition to computing relative distances, such as by differencing GPS location coordinates, the system 100 may utilize miniaturized optical, radar, or LIDAR sensors provided on the eyeglasses 102 (e.g., sensors that may be used with the golf ball tracking system 200) to determine the distance between the user and the one or more respective objects. This reading may then either be used instead of the GPS measurement, or may be fused with and/or used to refine the GPS measurement.

Once the distances to the various objects are computed, numerical representations 922 of the distances may be displayed within the user's view either coincident with the object or directly adjacent to the object. In this example, distances are computed and displayed for the nearest shoreline of the lake 906, the farthest shoreline of the lake 906, the prominent tree 908, the front, middle, and back of the green 910, and the center of the sand bunker 912. In one configuration, the marked objects (i.e., those objects to which distances are provided) may be pre-determined by the user, a different user, or a golf professional familiar with the course. Once the ball is struck, these distances may clear from the view, and other views (such as a ball trace) may be displayed.

In addition to merely computing and displaying distances to objects, the system 100 may be configured to display visual imagery in a manner that makes the imagery appear to the user as if it is resting on or slightly above the ground. For example, in FIG. 9B, the system 100 may project distance lines 924, 926, 928 across the fairway to indicate 100 yds, 150 yds, and 200 yds (respectively). It should be appreciated that these yardages are arbitrary, and may be customized by the user. In one configuration, such as schematically illustrated in FIG. 9C, the distance lines may coincide with average or typical hitting distances that are typical for the user following a full-powered swing. For example, the system 100 may project lines 930, 932, 934 that are representative of a full power swing from a 4 iron, a 5 iron, and an 8 iron (respectively). In one configuration, the club-based distance lines 930, 932, 934 that are displayed may dynamically adjust based on the determined yardages to the various objects and/or safe landing zones. In this manner, the system 100 may aid the user in determining the proper club to use for a given shot.

In one configuration, the club-based distance lines 930, 932, 934 may be based on hitting data that the user may manually enter into the system 100 according to known tendencies. In another configuration, the distance lines 930, 932, 934 may be based on actual shot data that is recorded by the system 100 and averaged for each club. This statistical averaging may, for example, use filtering techniques to prevent errant shots or outlier distances from affecting the mean-max club distances. To facilitate the automatic data-gathering, the system 100 must understand which club was used for each resulting shot. This may occur through, for example, user input, visual recognition of the club when the club is drawn from the bag (e.g., through visual recognition of the number on the sole of the club, or through other visual recognition means, such as 2D or 3D barcodes, QR Codes, Aztec Codes, Data Matrix codes, etc), RFID, or Near-Field Communications.

Figure 10:
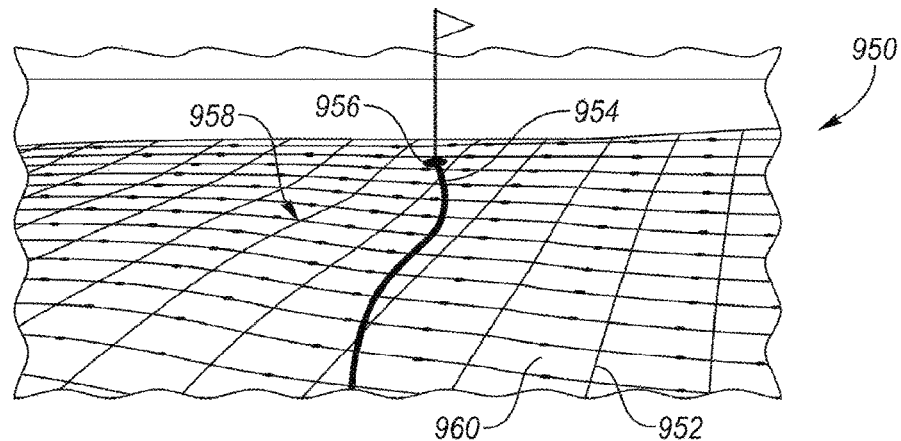
FIG. 10 is a schematic enhanced image of putting aid imposed upon a golfer's real world view.

Referring to FIG. 10, in one configuration, the enhanced image may further include a putting aid 950 that may assist the user in reading the curvature and/or undulations of the green. Such a putting aid 950 may include a slope grid 952 and/or an ideal trajectory line 954, which, if followed, would cause the ball to roll into the cup 956. In one configuration, the slope grid 952 may include a plurality of virtual water beads 958 that may flow along the grid lines according to the absolute slope of the green 960 along the line (i.e., where a steeper gradient would result in a faster moving water bead 958 along the grid line). In another configuration, the putting aid 950 may include, for example at least one of a plurality of arrows aligned with a gradient of the green (and pointing in a down-hill direction) and an indicator, such as a ball or cursor, that translates in a direction aligned with the gradient of the green. In this manner, the golfer may easily visualize whether he/she is putting uphill or downhill, and whether the ball may break to the right or to the left. The ideal trajectory 954 may take into account the slope of the green 960, and the respective locations of the ball and cup 956.

In the enhanced image examples provided in FIGS. 9B, 9C, and 10, the ability to project an image on the ground requires an understanding of the topology of the ground relative to the eyeglasses 102. In one configuration, the topology of the golf course may be uploaded to the system 100, either prior to the start of the round, or in near-real time. The processor 202 may then pattern match the perceived topology within the more detailed, uploaded topology to align the two coordinate frames. This alignment may use GPS, visual recognition, and/or LIDAR, to identify perspective cues and/or one or more fiducials to position and orient the glasses in three dimensions within the topographical model. Using the known position and orientation of the eyeglasses 102, the processor 202 may construct a perspective view of the topology from the point of view of the user. This perspective view of the topology may then be synchronized with the field of view of the user (such as may be digitally perceived via the camera 204) and the processor 202 may display the visual overlays/enhanced imagery via the eyeglasses 102 in a manner that makes it appear to rest on the ground or objects as desired. For example, in a green reading context, the one or more putting aids 950 may be displayed such that they are coincident with the perceived portion of the green 960.

In another configuration, rather than having the topographical information uploaded from an external database, it may instead be acquired in near-real time via one or more sensors disposed on the eyeglasses 102. For example, in one embodiment, the eyeglasses 102 may include a LIDAR sensor (e.g., which may be used with the golf ball tracking system 200). The LIDAR sensor may scan the proximate terrain with a sweeping laser (i.e., ultraviolet, visible, or near-infrared) to determine the distance between the sensor and each sampled point. The processor 202 may then skin the collection of points to form a model of the perceived topology.

When used to assist the user in reading the green 960, the system 100 may dynamically adjust to display the nearest green. In one configuration, the processor 202 may, for example, continuously receive an indication of the location of the user, such as from the user tracking system 206. Using this, the processor 202 may identify one of the plurality of stored greens that is closest to the user. The processor 202 may then display a representation of the topology of the identified green 960 via the heads up display glasses, within the field of view of the user (i.e., either an overhead view or a perspective view). During a round of golf, this may allow a user to see the contours of the green as he is readying for an approach shot, as well as while putting.

Figure 11:
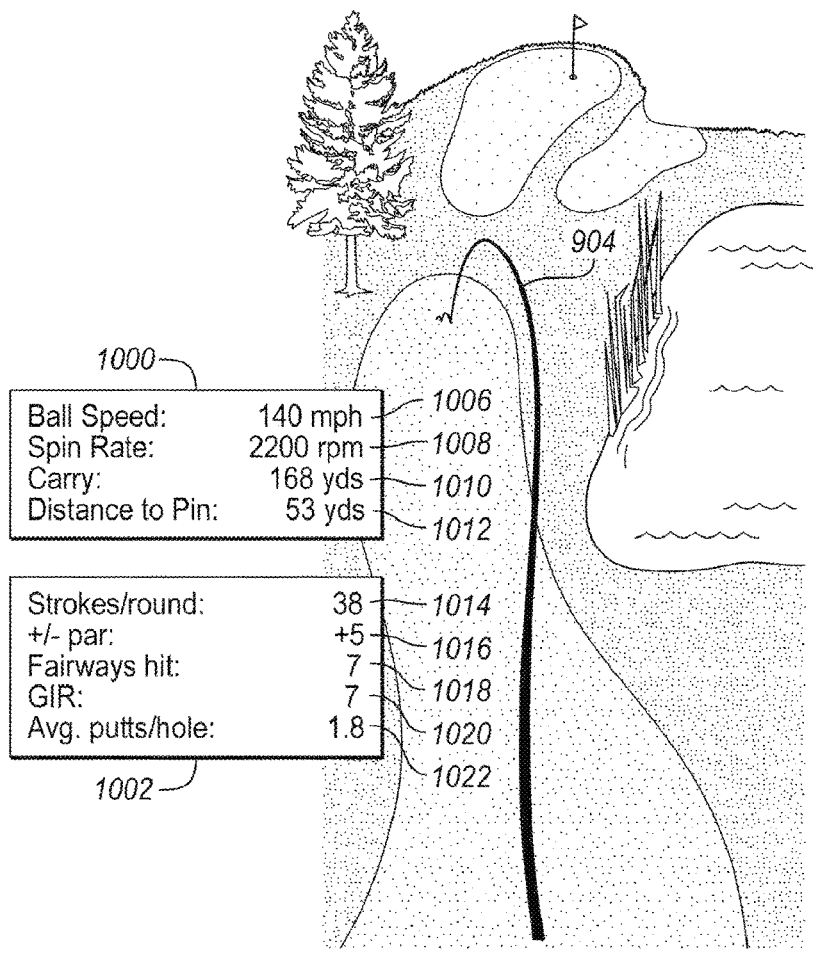
FIG. 11 is a schematic enhanced image of shot statistics and play statistics imposed upon the golfer's real world view of FIG. 9A.

While FIGS. 9B, 9C, and 10 schematically illustrate enhanced images before a shot, and FIG. 6 schematically illustrates an enhanced image during a shot, FIGS. 7 and 11 schematically illustrate enhanced images after a shot. As shown in FIG. 11, following a shot, the system 100 may textually display statistics that relate to both the previous shot 1000 (i.e., shot statistics 1000) and to more general play statistics 1002. The play statistics 1002 may be statistics that are aggregated either just for that particular round, or over a longer duration such as a season. In addition to displaying statistics following the shot, the system 100 may also maintain a ball flight trace 1004 within the enhanced image for a predetermined amount of time.

Statistics relating to the previous shot 1000 may include, for example, initial ball speed 1006, spin rate 1008, carry 1010, and/or remaining distance to the pin 1012. Play statistics 1002 may include, for example, total number of strokes for the round 1014, score relative to par 1016, fairways hit 1018, greens in regulation 1020, and/or average number of puts 1022.

The shot statistics 1000 may be directly acquired through the one or more sensors disposed on the eyeglasses 102, within the ball, or on an associated device (e.g., a launch monitor), or may be determined by the processor 202 through, for example, an analysis of the ball flight/trajectory. The play statistics 1002, however, may each be maintained in memory associated with the system 100 and updated following each shot. While certain play statistics 1002 (e.g., total strokes 1014 and average number of putts 1022) may be easily aggregated simply by observing the user, others require the processor 202 to have an understanding of the course. For example, a user's score relative to par 1016 requires the system 100 to have knowledge of the course scorecard. Likewise, fairways hit 1018 and greens in regulation 1020 may require the system 100 to have knowledge of the physical layout of the course. To facilitate this knowledge, in one configuration, a digital rendering of the course (i.e., layout and/or topology) and/or scorecard maybe uploaded to the system 100 prior to beginning the round. This layout and/or topology may be the same data that is uploaded, for example, to enable the system 100 to project imagery onto the ground within the user's real world view.

Figure 12:
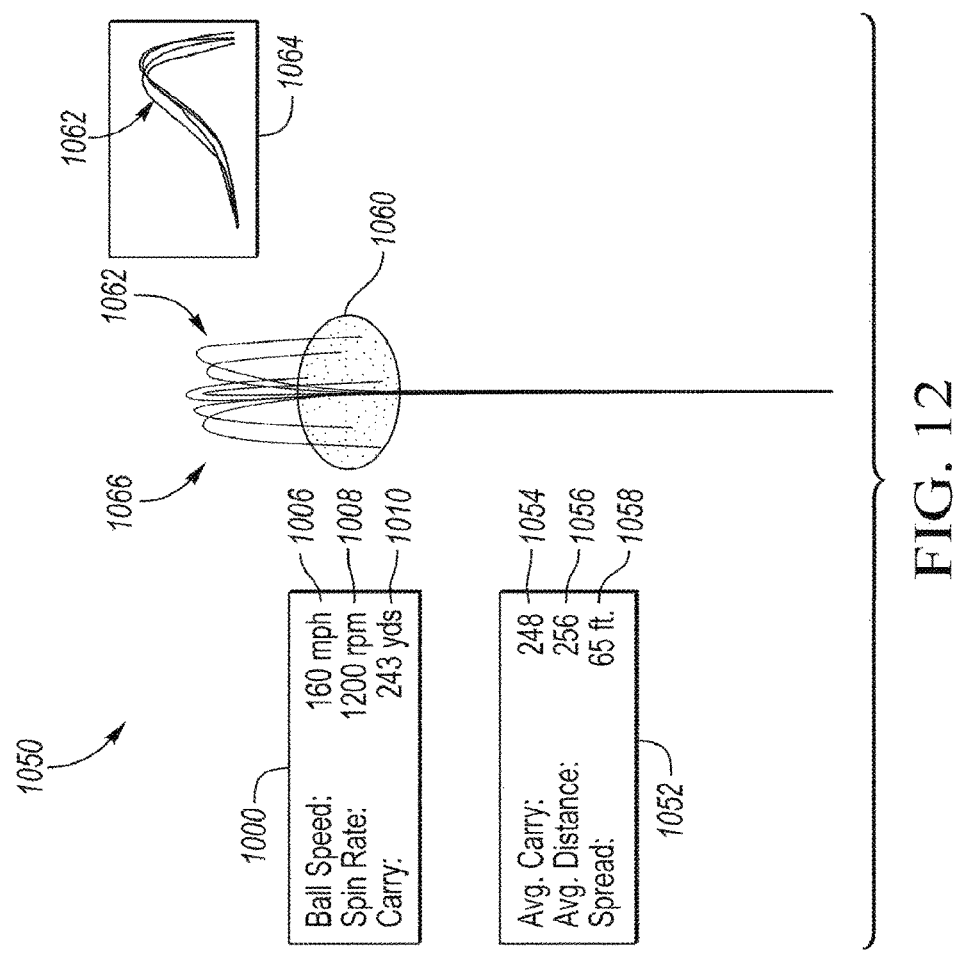
FIG. 12 is a schematic enhanced image of a plurality of ball traces and both shot statistics and club statistics imposed upon a golfer's real world view.

In addition to the above described game-play capabilities, the system 100 may further be configured in a practice mode, such as schematically illustrated via the enhanced display 1050 provided in FIG. 12. Practice mode may be particularly useful, for example, on a driving range, where the user may hit a plurality of golf balls in succession using a single golf club. In this embodiment, the system 100 may maintain shot statistics 1000 on each of the plurality of golf balls that are hit by one or more golf clubs. The shot statistics 1000 may be grouped and averaged on a club-by-club basis, which may then be displayed via the eyeglasses 102 as specific club statistics 1052 for a particular club. These statistics may be displayed for an individual club, such as when the user draws the club from his/her bag or immediately after a shot. Alternatively, the club statistics 1052 may be displayed for a plurality of clubs, such as in a table format. Displaying multiple clubs at once may educate the user about the variance and/or differences between clubs of slightly different lofts. For example, if a user was presently using a 5-iron, the system may display club statistics for the 5-iron, as well as for the 4-iron and 6-iron.

The club statistics 1052 for a particular club may include, for example, an average carry distance 1054, an average total distance 1056, and an accuracy metric 1058. The accuracy metric 1058 may attempt to characterize the amount of spray (i.e., a lateral deviation from an intended landing spot) that the user imparts to each of his/her respective clubs. For example, the accuracy metric 1058 may correspond to a width of a landing zone that is defined by the landing position of each of the plurality of golf balls hit by a particular club. Alternatively, it may represent a one standard deviation width of a distribution of landing positions for each of the plurality of golf balls.

In one configuration, the shot statistics 1000 and/or club statistics 1052 within practice mode may be determined either directly by sensors provided with the system 100 (e.g., sensors disposed on the eyeglasses 102), or via ancillary hardware (e.g. a launch monitor) that is in digital communication with the system 100.

In addition to maintaining the club statistics 1052 while in practice mode, the system 100 may also graphically represent a plurality of prior shots as traces 1062 via the enhanced display 1050. The system 100 may also be configured to display an inlaid image 1064 within the user's field of view that represents the plurality of traces 1062 from a direction that is perpendicular to each ball's respective flight path. In this manner, the user may visually assess his/her tendencies to spray the ball (e.g., via the traces 1062 provided in the primary portion 1066 of the enhanced display 1050), as well as the typical flight path/height of each respective shot (e.g., via the traces 1062 provided in the inlaid image 1064). As mentioned above, in one configuration, the system 100 may know which club the user is hitting either by direct user input, or by visually recognizing the number on the sole of the club as the user selects it from his/her bag. In this manner, the processor may group the one or more computed shot statistics according to a detected identifier on the club, and then compute the one or more club statistics 1052 for a particular golf club from the one or more shot statistics 1000 that are grouped/associated to a single detected identifier.

Figure 13:
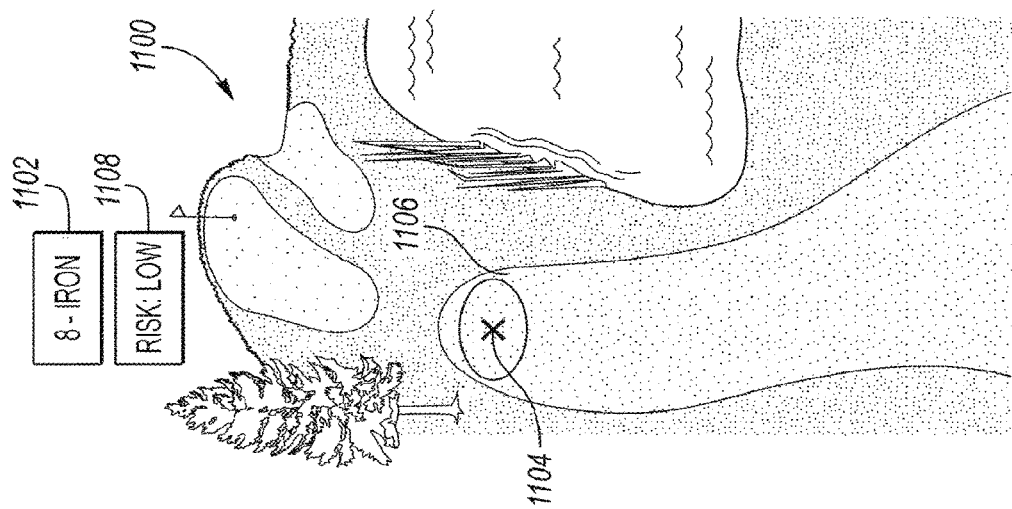
FIG. 13 is a schematic enhanced image of an optimized club selection and target imposed upon the golfer's real world view of FIG. 9A.

If a user trains the system 100 to understand the user's various club statistics 1052, then the system 100 may also be configured in an enhanced virtual caddy mode. In this mode, the system 100 may instruct the user both where to aim and which club to use. For example, as schematically shown in the enhanced view 1100 provided in FIG. 13, in one configuration, the system 100 may provide a textual graphic 1102 of the optimal club for a given shot. Additionally, the system 100 may project a target 1104 at a position on the course (i.e., via the eyeglasses 102) where the user should aim with that respective club. The target 1104 may be, for example, a dot or cross-hair that is illustrated at the desired landing spot, or may be an illustrated post or flag stick that graphically appears to be sticking out of the ground at the desired landing spot. The target 1104 may be positioned at the user's statistical mean landing spot for the club suggested. Additionally, the system 100 may project, for example, a 1-standard deviation accuracy circle 1106 onto the grass around the target 1102. In this manner, the user may quickly identify whether certain hazards may be in play for that shot.

In the virtual caddy mode, the user may either pre-select his/her intended degree of risk prior to the round and/or may be able to change the desired risk level on a shot-by-shot basis. The risk level may be displayed via the eyeglasses 102 as a textual risk indicator 1108 prior to the shot. The level of risk may serve as an input into an optimization routine performed by the processor 202, and may influence both the club that the system 100 selects and the positioning of the target 1104 on the course. More specifically, the level of risk may adjust a weighting parameter in an optimization routine that seeks to minimize both the remaining distance to the hole and the statistical likelihood that a hazard will be in play (i.e., longer hitting woods/irons typically have a larger spray, which may increase the likelihood of bringing hazards into play (based on the design of the hole); shorter hitting wedges/irons have a narrower spray and can be more accurately aimed, though lack the hitting distance of the longer irons/woods).

In one configuration, an optimization method may begin by determining the most optimal target for each club, based on the course layout, the user's current position, and the stored club statistics 1052. Each optimal target for a club may be disposed at a location on the course that is spaced from the location of the user by a distance that is equal to the average total distance for the respective club used (i.e., where average total distance is a club statistic that is previously stored in memory associated with the processor). To choose the specific heading for each optimal target, the processor may then find a location that provides the most ideal combination of lie and remaining distance to the pin.

More specifically, in determining the optimal target, the system 100 may score each type of lie within a statistical circle around the target, corresponding to a probable/statistical landing zone and/or derived from the accuracy metric for the respective club. For example, out of bounds and water hazards may have a score of 0.0; flat, unobstructed fairway may have a score of 1.0; and obstructed shots, sand, long rough, medium rough, short rough, and uneven lies may have differing scores that range between 0.0 and 1.0. The processor may then integrate the lie score (or may average the lie score) across the statistical circle to determine an aggregate lie score. Using this scoring, the processor 202 may determine the most optimal target for each club that provides the most ideal lie (i.e., in the scoring described above, the ideal lie would maximize the aggregate lie score), while also minimizing the remaining distance to the hole. Such a determination may occur using a first risk-weighted optimization that operates according to a first weighting parameter that may generally favor an improved lie over a minimized distance (i.e., where distance may factor in, for example, in deciding between two targets with identical lies, and in preferring shots toward the hole rather than away from the hole).

Once the most optimal target is selected for each club, the processor 202 may determine a new risk-weighted score for each club that combines a remaining distance to the hole for an optimized target with the aggregate lie score for the optimized target. This determination may be based on second weighting factor that is selected by the user to indicate the user's predetermined risk level. In this manner, a high risk would more heavily favor a minimum remaining distance, while a low risk would more heavily favor a more ideal lie. Once a risk-weighted score is determined for each club, the club having the highest risk-weighted score may be suggested to the user as a textual graphic 1102, and the optimal target 1104 may be displayed in a proper position within the enhanced view. Additionally, in an embodiment, the statistical landing zone may be displayed as a circle around the target. In other configurations, the user may further be able to specify (or the system 100 may deduce) preferred approach distances, which may also affect the optimization.

Figure 14:
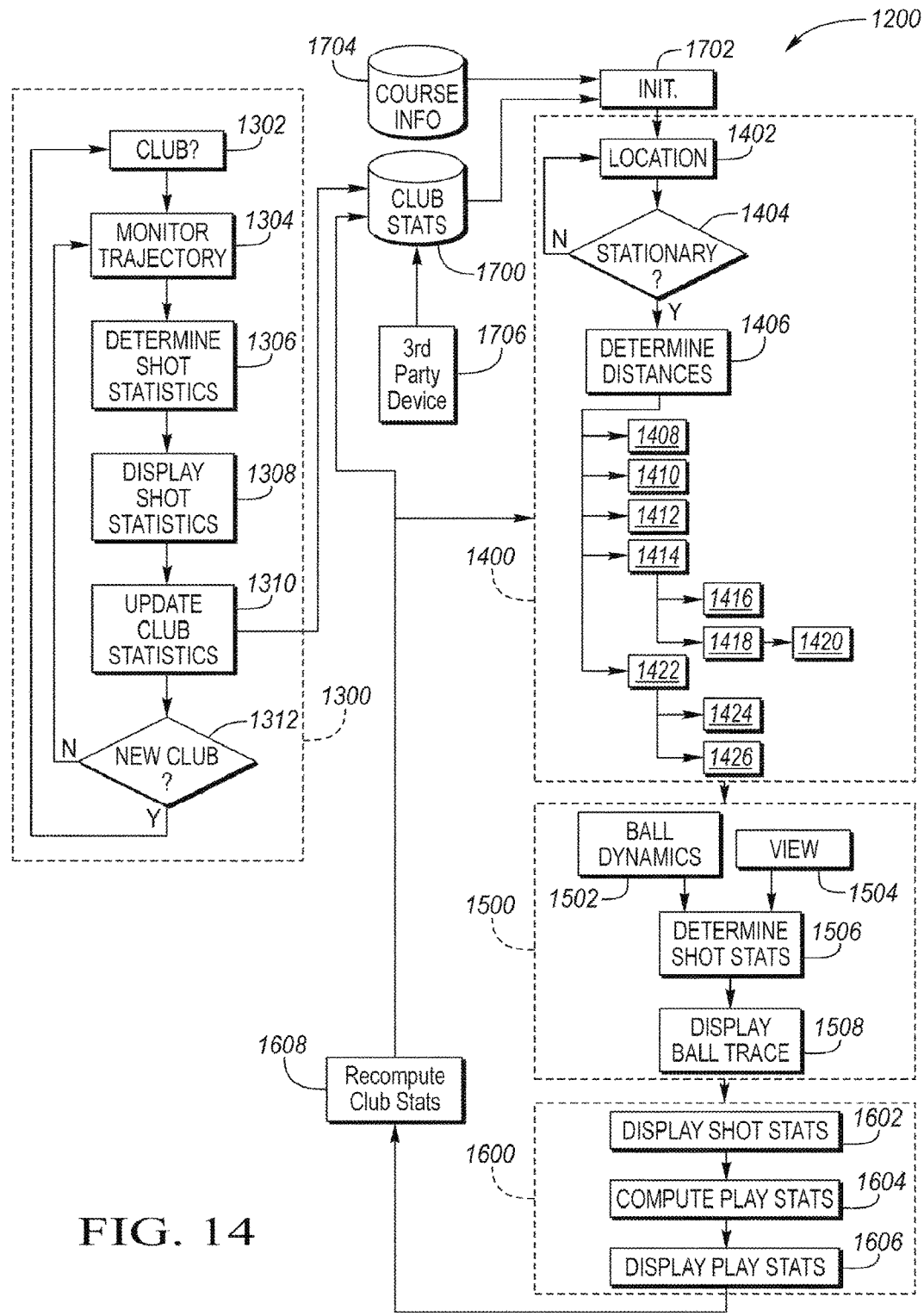
FIG. 14 is a schematic flow chart of a method that may be performed by a processor to provide enhanced imagery within a practice mode, before a shot, during a shot, and after a shot.

Finally, FIG. 14 schematically illustrates a method 1200 that may be performed by the processor 202. This method 1200 includes functionality that may exist in practice mode 1300, and also during a round before a shot 1400, during a shot 1500, and after a shot 1600. As shown, during practice mode 1300, the processor 202 may begin by determining a club that is being used at 1302. This may entail either receiving a user input that is indicative of the club, or by receiving a visual indication of a number provided on a sole of the club from a visual sensor associated with the eyeglasses 102.

Once the club is determined at 1302, the processor 202 may monitor the trajectory of a struck golf ball at 1304, determine one or more shot statistics 1000 at 1306, display the one or more determined shot statistics 1000 via the eyeglasses 102 at 1308, and update the one or more club statistics 1052 at 1310. In one configuration, steps 1304 and 1306 may be performed using input from one or more sensors disposed, for example, on the eyeglasses 102. In another configuration, steps 1304 and 1306 may be performed using input obtained from an ancillary device, such as a launch monitor, that is in digital communication with the processor 202. In this instance, the term processor 202 is intended to encompass both configurations, and may include multiple computing devices in digital communication.

Following a given shot, the processor 202 may determine if a new club is selected at 1312. If so, it may revert back to step 1302, or else may wait for the next shot at 1304. The club statistics may then be stored in memory 1700 associated with the system 100 for subsequent use.

Prior to a round of golf, the system 100 may be initialized at 1702 by uploading course statistics, course layout and/or topology, and/or a course scorecard (i.e., collectively "course information") from an external database 1704 to the processor 202. Additionally, during this initialization step 1702, the user's club statistics 1052 may be made available to the processor 202 from memory 1700. While in one configuration, the club statistics 1052 may be derived from a practice mode using the present system, in another configuration the club statistics 1052 may be uploaded to the memory 1700 via any commercially available 3rd party devices 1706, such as golf simulation devices or launch monitors.

Prior to a shot, the processor 202 may monitor a user's real-time location at 1402. This may include monitoring one or more GPS receivers, RF triangulation modules, and optical sensors to determine the location of the user within the course. If the user is not stationary (at 1404), then the processor 202 may continue monitoring the user's position. If the user's location has become stationary, then at 1406, the processor 202 may determine the distance between the user and any object, hazard, landmark, or course feature (e.g., fairway, rough, green) that may be within a predetermined distance of the user and/or between the user and the furthest portion of the green from the user. This determination may occur using GPS coordinates and/or one or more optical sensors, such as LIDAR.

Following the distance determination at 1406, the processor may perform one or more of the following: display one or more of the determined distances to the user via the eyeglasses 102 (at 1408); display one or more yardage-based distance lines 924, 926, 928 to the user via the eyeglasses 102 (at 1410); display one or more club-based distance lines 930, 932, 934 to the user via the eyeglasses 102 (at 1412); perform a risk-weighted optimization to determine at least one of an optimal club and an optimal target (at 1414); display an optimal club to the user via the eyeglasses 102 (at 1416); display an optimal target to the user via the eyeglasses 102 (at 1418); display the user's statistical landing zone about the target via the eyeglasses 102 (at 1420); and display a putting aid to the user via the eyeglasses 102 (at 1422), where the putting aid includes either a displayed grid (at 1424) or an ideal putting trajectory (at 1426).

During the shot 1500, the processor 202 may receive a data input corresponding to the ball dynamics (at 1502) and/or the user's view (at 1504). From this input, the processor 202 may then determine one or more shot statistics 1000 (at 1506). The determined shot statistics 1000 may include, for example, ball speed, 1006, spin rate 1008, carry 1010, and remaining distance to the pin 1012, and may be determined from the observed ball trajectory, the observed club impact angle/speed, or from an associated launch monitor or ancillary device/sensor. Additionally, during the ball flight, the processor 202 may display a visual indicator, trace, or other overlay via the eyeglasses 102 that corresponds with the actual, observed flight of the ball (at 1508).

After the shot 1600, the processor 202 may display the one or more determined shot statistics 1000 via the eyeglasses 102 (at 1602). Additionally, the processor 202 may then compute one or more play statistics 1002 (at 1604), and may display the one or more computed play statistics 1002 to the user via the eyeglasses 102 (at 1606). The processor 202 may then recompute the club statistics 1052 (at 1608) and resume monitoring the user's real-time location at 1402 to prepare for the next shot.

While the use of the eyeglasses 102 is the preferred manner of practicing the present invention, in alternate configurations, one or more of the steps of displaying the various pre-shot distances and/or post-shot shot statistics 1000 or play statistics 1002 may occur using the interface 114 (shown in FIG. 1), which may include a hand held device, such as a smart phone or tablet. Additionally, in a further embodiment, pre-shot distances and/or post-shot shot statistics 1000 or play statistics 1002 may be superimposed on a video stream that is captured by a camera on the hand held device, and displayed by an LCD/OLED/LED display device integrated within the hand held device. In this embodiment, the glasses may not be strictly required.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed:

1. An electronic tracking system for assisting a user with locating objects in a sporting environment, the electronic tracking system comprising:
    a ball tracking component configured to track a ball in the sporting environment;
    a heads up display configured to be worn by the user, the heads up display having a display screen with a transparent display area configured to display an image within a field of view of the user; and
    a processor in communication with the ball tracking component and the heads up display, the processor being configured to:
        determine a location of the ball within the sporting environment; and
        direct the heads up display to display an object indication adjacent to or superimposed over the ball as the ball is visible through the transparent display area of the display screen within the field of view of the user.

2. The electronic tracking system of claim 1, further comprising a user tracking component in communication with the processor and configured to determine a location of the user, the processor being further configured to:
    determine a distance between the determined location of the user and the determined location of the object within the sporting environment; and
    direct the heads up display to display a numeric representation of the determined distance coincident with or adjacent to the ball as the ball is visible through the transparent display area of the heads up display.

3. The electronic tracking system of claim 1, wherein the ball tracking component includes a ball tracking sensor in communication with the processor, wherein the ball tracking sensor is configured to track the ball using radar, LIDAR, optical sensing, or sonar, or any combination thereof.

4. The electronic tracking system of claim 1, wherein the ball tracking component is further configured to monitor one or more launch characteristics or flight characteristics, or both, of the ball.

5. The electronic tracking system of claim 4, wherein the processor is further configured to direct the heads up display to display the one or more launch characteristics or flight characteristics, or both, of the ball via the display screen.

6. The electronic tracking system of claim 1, further comprising a landmark location component in communication with the processor and configured to determine a location of a landmark within the sporting environment, the processor being further configured to direct the heads up display to display a landmark indicator of the landmark superimposed over or adjacent to the landmark as the landmark is visible through the transparent display area of the heads up display.

7. The electronic tracking system of claim 6, wherein the landmark includes a tree, a natural hazard, a body of water, a sand trap on a golf course, a dogleg on the golf course, or a portion of a green on the golf course, or any combination thereof.

8. The electronic tracking system of claim 1, wherein the object indication includes a comet tail trailing behind the ball within the field of view of the user, or an enhanced image of the ball that is superimposed over the ball within the field of view of the user, or both.

9. The electronic tracking system of claim 1, further comprising a camera in communication with the processor and configured to capture an image of the field of view of the user, the processor being further configured to determine from the captured image where to display the object indication superimposed over the object upon the field of view.

10. The electronic tracking system of claim 1, further comprising a headgear component configured to be worn on the head of the user, the heads up display being attached to the headgear component and configured to be worn in front of the eyes of the user.

11. The electronic tracking system of claim 10, wherein the ball tracking component and the processor are mounted inside the headgear component.

12. The electronic tracking system of claim 1, wherein the ball tracking component includes one or more communication components and a microchip attached to the ball, and wherein the processor is configured to determine the location of the ball from signals emitted by the microchip and received via the one or more communication components.

13. The electronic tracking system of claim 1, wherein the ball includes a golf ball, a baseball, a tennis ball, a football, and/or a field hockey ball.

14. The electronic tracking system of claim 1, further comprising a user interface in communication with the processor, the user interface having one or more input devices configured to receive inputs from the user and transmit control signals indicative thereof to the processor.

15. An electronic tracking device for assisting a user with locating objects in a sporting environment, the electronic tracking device comprising:
    a headgear component configured to be worn on the head of the user;
    a user tracking component attached to the headgear component and configured to track a location of the user;
    a ball tracking component attached to the headgear component and configured to track a location of a ball within the sporting environment;
    a heads up display attached to the headgear component and configured to be worn in front of one or more eyes of the user, the heads up display having a display screen with a transparent display area configured to display images; and
    a processor in communication with the user tracking component, the ball tracking component, and the heads up display, the processor being configured to:
        determine a location of the user via the user tracking component;
        determine a location of the ball within the sporting environment via the ball tracking component; and
        direct the heads up display to display an object indication adjacent to or superimposed over the ball as the ball is visible through the transparent display area of the display screen within a field of view of the user.

16. A non-transitory, computer readable medium storing instructions for execution by a processor of an electronic tracking system, the electronic tracking system including a user tracking component, a camera, a sensor, and a heads up display, the instructions causing the electronic tracking system to perform steps comprising:
    determining a location of a user via the user tracking component;
    detecting a ball in a sporting environment via the sensor;
    receiving an indication of a field of view of the user from the camera, the camera being disposed adjacent to the heads up display, and the heads up display having a display screen with a transparent display area configured to display an image within the field of view of the user; and
    displaying an object indication coincident with or adjacent to the detected ball as the ball is visible through the transparent display area of the display screen of the heads up display.

17. The computer readable medium of claim 16, further comprising instructions for causing the electronic tracking system to perform steps comprising:
    monitoring one or more launch characteristics or flight characteristics, or both, of the ball; and
    directing the heads up display to display the one or more launch characteristics or flight characteristics, or both, of the ball via the display screen.

18. The computer readable medium of claim 16, wherein the object indication includes a comet tail trailing behind the ball within the field of view of the user, or an enhanced image of the ball that is superimposed over the ball within the field of view of the user, or both.

19. The computer readable medium of claim 16, wherein the ball includes a golf ball, a baseball, a tennis ball, a football, and/or a field hockey ball.

20. The computer readable medium of claim 16, further comprising instructions for causing the processor to receive, from one or more input devices of a user interface in communication with the processor, control signals indicative of inputs from the user.

* * * * *